United States Patent [19]

Cornett et al.

[11] 4,224,621
[45] Sep. 23, 1980

[54] PPI DISPLAY FOR RADAR AND SYNTHETIC SYMBOLOGY

[75] Inventors: Johnny A. Cornett; Howard S. Gentry, both of Earlysville; Wilfred M. Seay; Terry A. Tucker, both of Charlottesville; Donald J. Wigent, Earlysville, all of Va.

[73] Assignee: Sperry Corporation, New York, N.Y.

[21] Appl. No.: 51,937

[22] Filed: Jun. 25, 1979

[51] Int. Cl.² .............................................. G01S 7/22
[52] U.S. Cl. .............................................. 343/5 EM
[58] Field of Search ................ 343/5 ST, 5 EM, 5 SC

[56] References Cited

U.S. PATENT DOCUMENTS

| 3,717,873 | 2/1973 | Riggs ................................ 343/5 EM |
| 3,725,918 | 4/1973 | Fleischer et al. ................. 343/5 EM |
| 3,810,174 | 5/1974 | Heard et al. ..................... 343/5 SC X |
| 3,899,769 | 8/1975 | Honore et al. ................... 343/5 EM X |
| 3,971,018 | 7/1976 | Isbister et al. ................... 343/5 EM X |
| 4,069,481 | 1/1978 | Easy et al. ....................... 343/5 EM X |

*Primary Examiner*—Malcolm F. Hubler
*Attorney, Agent, or Firm*—Howard P. Terry; Albert B. Cooper

[57] ABSTRACT

A complete frame of radar data is stored in radar real time addressed in accordance with antenna azimuth. The PPI rotating display scan is generated by deflecting the beam along the azimuth sweeps thereof under control of X-rate and Y-rate signals provided for each sweep. The X-rate and Y-rate signals are applied sequentially to X and Y binary rate multipliers which generate clock signals at a frequency proportional to the rate signals. The clock signals are applied to X and Y position counters respectively for generating the X and Y deflection signals via digital-to-analog converters. Sequential application of the X and Y rate signals to the X and Y rate multipliers generates the rotating scan. The radar data stored in memory is accessed in accordance with the azimuth address in synchronism with the generation of the azimuth display sweeps. The stored data provides the video signal for the display tube so as to generate the radar display. The rotating scan is generated in non-real radar time at a rapid rate. X-rate and Y-rate signals are also applied to the binary rate multipliers for generating concatenated straight line strokes to display synthetic symbology. ΔX and ΔY signals are utilized to control the lengths of the strokes.

19 Claims, 8 Drawing Figures $$X-RATE = \frac{\Delta X}{\Delta T} = \frac{CHANGE\ IN\ X}{CHANGE\ IN\ TIME} = K \cos \theta$$

$$Y-RATE = \frac{\Delta Y}{\Delta T} = \frac{CHANGE\ IN\ Y}{CHANGE\ IN\ TIME} = K \sin \theta$$

$$\Delta X = R \cos \theta$$
$$\Delta Y = R \sin \theta$$

PPI DISPLAY FOR RADAR AND SYNTHETIC SYMBOLOGY

BACKGROUND OF THE INVENTION

1. Field of the Invention

The invention relates generally to radar PPI displays and is particularly adaptable to marine collision avoidance radar systems.

2. Description of the Prior Art

Collision avoidance radar systems are known in the art that presents radar target information on a plan position indicator (PPI) display along with synthetically generated symbology to provide collision avoidance information to the ship officers with respect to threats of collision between own ship and the radar detected target ships. Such a system is disclosed in U.S. Pat. No. 3,725,918, issued Apr. 3, 1973 to Fleischer et al entitled "Collision Avoidance Display Apparatus For Maneuverable Craft" and assigned to the present assignee.

In systems exemplified by that disclosed in said U.S. Pat. No. 3,725,918, generally the radar target data is provided on a cathode ray tube PPI display with synthetically generated symbology written during the deadtime of the PPI azimuth sweeps. Such systems utilize the radar trigger to initiate the azimuth sweeps and the radar antenna position data to position the sweeps in azimuth in synchronism with the rotating antenna. In typical systems the radar antenna executes a complete rotation every one to three seconds. Therefore in such systems the display is updated at this slow rate, presenting viewing difficulties which are particularly aggravated in daylight. Such displays provide the conventional PPI appearance of a radially directed azimuth sweep emanating typically from the center of the screen and slowly rotating about the center thereof in synchronism with the slow rotation of the radar antenna "painting" the radar targets as the sweep slowly rotates across the azimuth positions thereof.

As discussed above, in such systems synthetic symbology is drawn during the flyback or deadtime of the azimuth sweeps. Such an arrangement generally requires separate electronic circuitry and display deflection means such as deflection coils or plates for the display of the synthetic symbology. Such separate display presentation provisions increases the cost and size of the equipment as well as decreases its reliability. Additionally, separate deflection means for the radar data and for the synthetic symbology introduces critical alignment and registration problems between the information provided by the separate deflection means.

Because of the above described arrangement for such displays, radar target as well as synthetic symbology brightness is limited resulting in viewing difficulties particularly in daylight. Since the azimuth sweep flyback time during which the synthetic symbology is written is of very short duration, high writing rates are required in order to draw the significant amount of symbology required in such displays. The high writing rate coupled with the exceedingly slow refresh rate of the PPI results in a display that is difficult to view. The high writing rate required necessitates wide bandwidth deflection amplifiers thereby increasing the power dissipation of the system.

Additionally, in these prior art systems, a brightness problem and a concomitant power dissipation disadvantage existed with respect to writing and radar data. When the range scale of such systems was decreased a faster azimuth sweep rate was required, causing a diminution in radar target brightness relative to that provided at the larger range scale. This not only resulted in a display that was difficult to view because of dimly drawn symbology but also resulted in non-uniformly bright radar displays on the various range scales of the system. This non-uniformity in brightness with respect to the radar data coupled with the brightness problems discussed above with respect to the synthetic symbology provided an overall display wherein the intermixed symbols were undesirably non-uniformly bright.

In the prior art systems the differing beam sweep rates required on different range scales of the system not only resulted in non-uniform brightness, but also in excessive power dissipation. In such systems it was necessary to provide deflection amplifier bandwidths in accordance with the fastest sweep rates required. The power supplies for the wide bandwidth amplifiers necessarily provided sufficient power corresponding to the bandwith. When slower sweep rates were utilized on the larger range scales of the system the resulting power dissipation was greater than required.

SUMMARY OF THE INVENTION

The above delineated disadvantages of the prior art were overcome by the present invention by digitizing the analog radar returns and storing a full frame of data in range, azimuth $(R,\theta)$ format in a memory addressed in accordance with the radar antenna azimuth and at a rate in accordance with the scanning rate of the antenna. A rapidly rotating PPI scan is generated for the display and the memory is addressed at the azimuth address in accordance with the azimuth of the display being scanned to provide the radar data for intensifying the display.

The azimuth sweeps of the rapidly rotating PPI display scan are generated from X-rate and Y-rate signals corresponding to the azimuth angle $\theta$. The length of the azimuth sweeps are controlled by $\Delta X$ and $\Delta Y$ length signals or by a range comparison with respect to the edge of the display screen.

Synthetic symbology is displayed with the radar symbology utilizing the same deflection circuitry used in generating the PPI scan. The synthetic symbology is comprised of straight line segments each drawn in accordance with X-rate, Y-rate, $\Delta X$ and $\Delta Y$ signals. When generating the PPI scan, the starting point for each azimuth sweep is reinitiated. When drawing the straight line segments of the synthetic symbology, the line segments are not reinitiated but are generally concatenated.

DESCRIPTION OF THE PREFERRED EMBODIMENT

Figure 1:
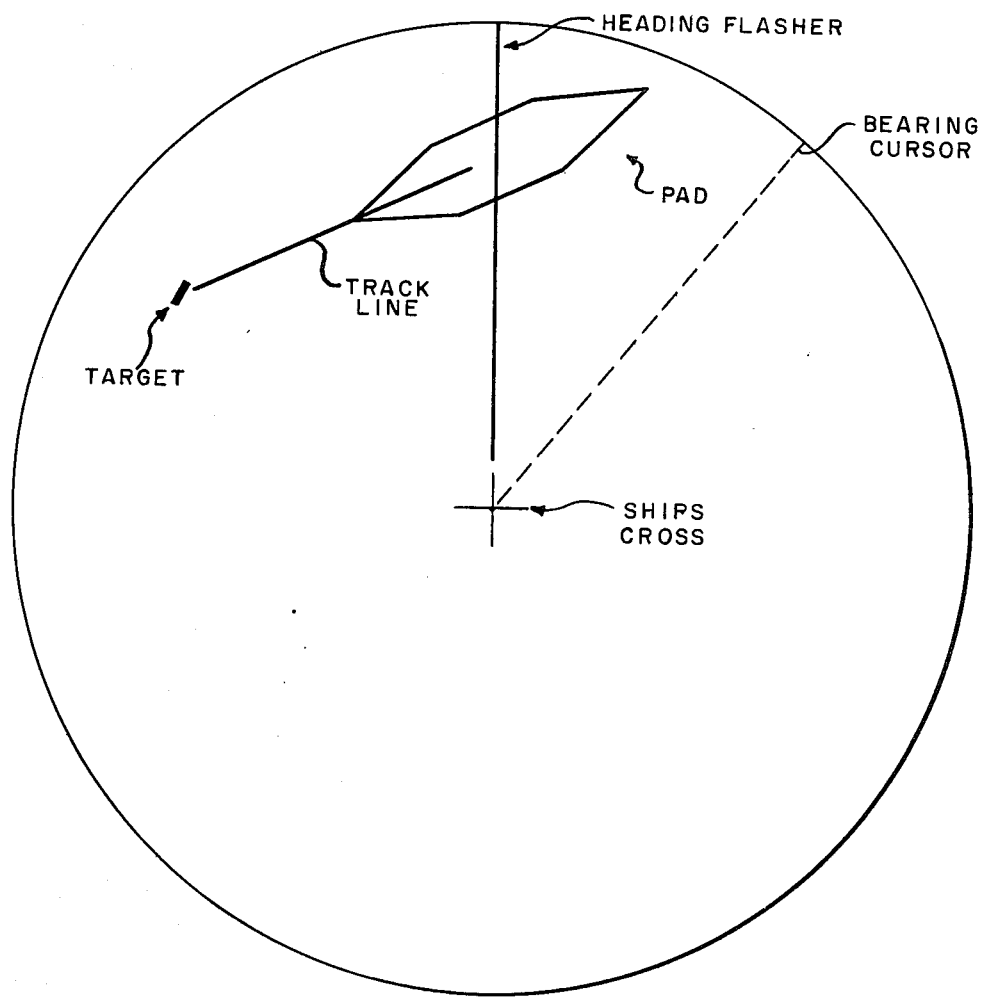
FIG. 1 is a view of a typical display presentation including radar and synthetic symbology generated in accordance with the invention.

Referring to FIG. 1, a typical collision avoidance display including radar symbology and synthetically generated symbology, is illustrated. The ship's cross defines the location of own ship and for convenience is placed at the center of the display. A heading flasher line indicating the heading of own ship as well as a dashed line bearing cursor, which may be positioned under operator control, are illustrated. The display of FIG. 1 further includes a radar target which may correspond, for example, to a target ship detected by the radar system. Emanating from the target is a track line which denotes the projected future track of the target. The track line ends at the center of a Probable Area of Danger (PAD) generally comprising in the system of the present invention a geometric figure enclosed by six straight lines. The PAD represents that area that own ship should avoid to preclude collision with the target ship.

It will be appreciated that the symbols such as the track line and PAD are generated utilizing the algorithms disclosed in said U.S. Pat. No. 3,725,918, the track lines and PADS relative to the detected targets and own ship's cross being positioned on the display screen in range and azimuth in a manner similar to that described in said patent. In said U.S. Pat. No. 3,725,918 ellipses were utilized to designate the PADS whereas in the present system similar geometric figures are utilized comprising straight line segments. Generally the end points of the ellipses along the longitudinal axes thereof in said U.S. Pat. No. 3,725,918 correspond to the end points along the longitudinal axes of the PADS of the present system. These end points are computed in the present system in a manner identical to that disclosed in said U.S. Pat. No. 3,725,918. Similarly, the width across the lateral axes of the hexagonally shaped PADS of the present system is the same as the width of the elliptically shaped PADS of said U.S. Pat. No. 3,725,918, which distance generally corresponded to twice the desired miss distance between own ship and target ship.

It will be appreciated that in an actual use of a collision avoidance system incorporating the invention numerous targets with corresponding track lines and PADS will be displayed on the screen in a manner similar to that illustrated in said U.S. Pat. No. 3,725,918. Although FIG. 1 is illustrated with own ship's cross located at the center of the display, an offset presentation may conveniently be utilized with own ship's cross located toward the bottom of the screen.

It is appreciated that as a result of the present invention there is the complete absence of the typical slowly rotating azimuth sweepwhich, approximately once every one to three seconds, paints all of the symbology on the tube. The display of FIG. 1 appears as a continuously present bright display easily viewed even under daylight conditions.

For the purposes of the present invention the display screen of FIG. 1 may be considered as quantized into a predetermined number of radially directed azimuth sectors, each sector being considered quantized into a predetermined number of range cells. For convenience, the screen may be considered quantized into, for example 1,024 azimuth sectors, each sector comprising 256 range cells.

It will be further appreciated that in the present invention, all of the synthetic symbology is generated utilizing stroke writing with straight line segments.

Figure 2:
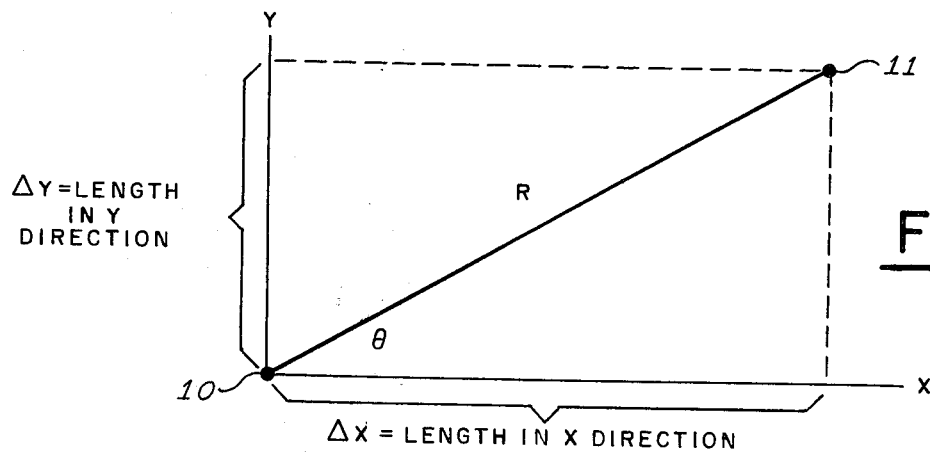
FIG. 2 is a graph illustrating parameters utilized in generating the rotating scan and stroke symbology in accordance with the invention.

Referring to FIG. 2, parameters useful in explaining the generation of the rotating $(R,\theta)$ PPI scan of the present invention are illustrated. The same parameters are utilized in generating the straight line strokes used in drawing the synthetic symbology. The beam is moved from a first point 10 to a second point 11 under control of signals designated as $\Delta X$ and $\Delta Y$ to provide the vector R from the point 10 to the point 11. The magnitude of $\Delta X$ and $\Delta Y$ therefore defines the length of the vector R as well as its end point. Two additional parameters X-rate and Y-rate are utilized to determine the angle $\theta$ and to control the sweep rate of the beam as it traverses the vector R. As indicated by the legends, X-rate and Y-rate are equal to $K \cos \theta$ and $K \sin \theta$, respectively, where the parameter K controls the beam sweep rate. Associated with the $\Delta X$ and $\Delta Y$ signals are $\Delta X$ and $\Delta Y$ sign signals for controlling the directions of the vectors being generated, in a manner to be explained, in accordance with the quadrant in which the angle $\theta$ is located.

The four parameters $\Delta X$, $\Delta Y$, X-rate and Y-rate are utilized to provide not only the azimuth sweeps of the rotating $(R, \theta)$ display scan but also the straight line strokes for the generation of synthetic symbology. When utilized to generate the rotating radar scan the azimuth sweeps originate, for a centered display, at the center thereof and are terminated at the display edge. Thus $\theta X$ and $\theta Y$ for this mode of operation are set to provide the appropriate sweep length. Alternatively, the beam position may be compared to the edge of screen range and the sweep terminated thereat. In the rotating scan radar mode the beam position is reset to zero after each sweep. When generating synthetic symbology comprising concatenated straight line strokes, the $\theta X$ and $\theta Y$ parameters determine the length of the strokes with the X-rate and Y-rate parameters determining the angle thereof as well as the writing rate. In the symbology writing mode of the apparatus the beam position is not reset at the end of each stroke thereby concatenating the vectors to form the symbology.

In the rotating scan radar mode, as the azimuth sweeps are being generated, the beam is intensified by stored radar data to display the radar targets. In the synthetic symbology writing mode the beam is continuously intensified when generating the strokes required for the symbols. In both modes the value of K (FIG. 2) is maintained constant providing a constant writing rate in both modes for all range scales, vector and sweep lengths and angles, thereby providing a uniform display under all conditions. The writing speed controlled by the parameter K may be selected to provide a bright display even under daylight conditions.

Figure 3:
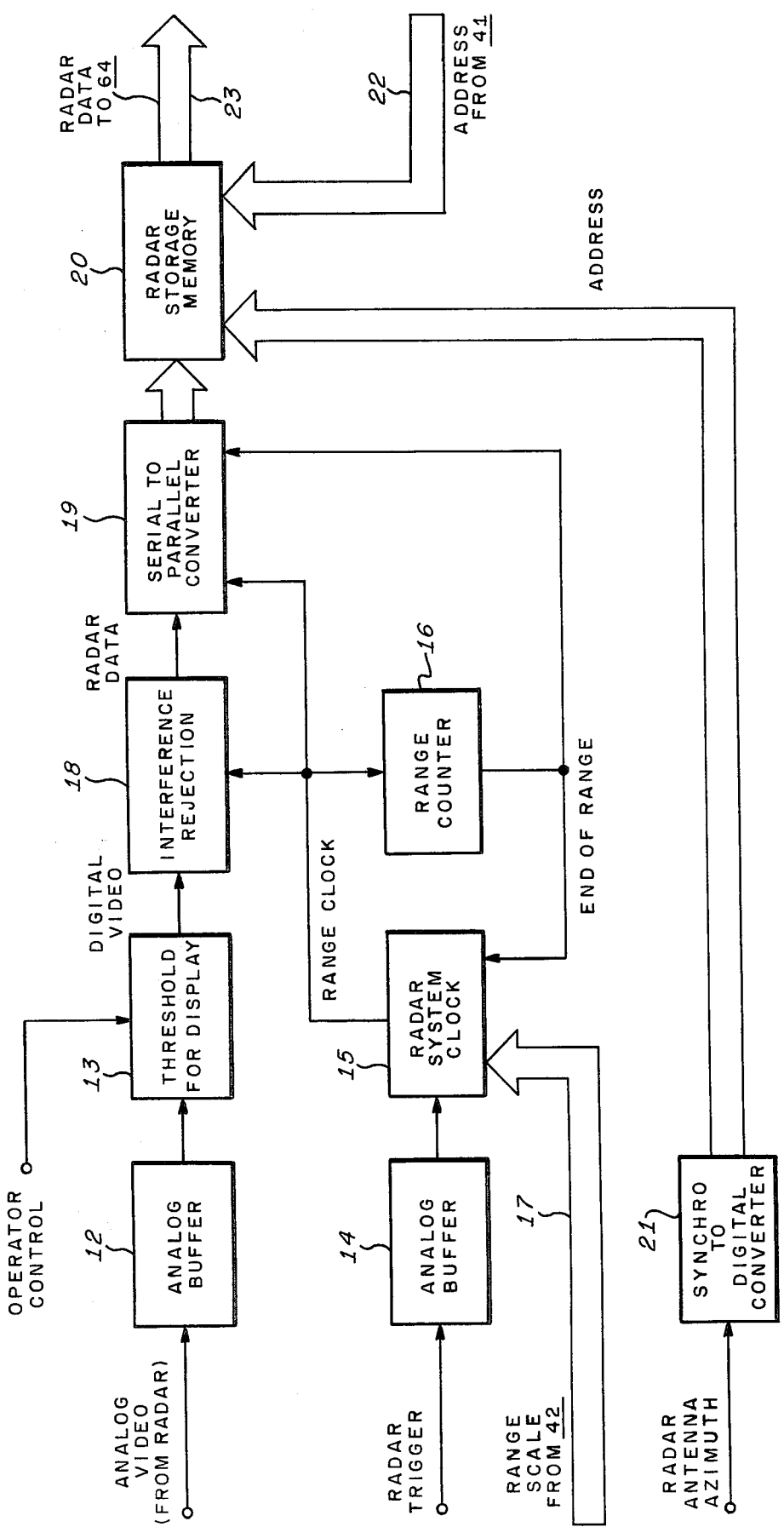
FIG. 3 is a schematic block diagram illustrating the radar storage portion of the apparatus in accordance with the invention.

Referring to FIG. 3, a schematic block diagram of the radar storage portion of the apparatus of the present invention is illustrated. The analog video from own ship's radar is applied to an analog buffer 12. The analog buffer 12, in a conventional manner, converts the analog radar video into signals suitable for application to the circuitry downstream thereof. The buffered analog radar video is applied to a threshold device 13 wherein the video is digitized. The threshold device 13 digitizes the analog radar returns by providing a binary ONE signal when the amplitude of the radar return exceeds a threshold and a binary zero signal when the return does not exceed the threshold. The threshold is set by an operator control (not shown) in accordance with the level of noise that the operator will accept on the display. Thus by adjusting the control the system operator determines how much noise such as sea clutter and the like will be displayed.

The radar trigger from own ship's radar is applied via a conventional analog buffer 14 to a radar system range clock 15. The range clock output from the system clock circuit 15 is applied to a range counter 16 which, in turn, provides an end of range signal. The radar trigger from the buffer 14 is utilized to start the system clock 15 and the end of range signal from the counter 16 is utilized to stop the clock. The range counter 16 is arranged to overflow to provide the end of range signal after counting the number of range clock pulses corresponding to the number of range bins into which the radar range sweeps are quantized. In the system of the present invention range is conveniently quantized into 256 range bins. Thus the range counter 16 provides the end of range signal after counting 256 of the range clock pulses.

In a manner and for reasons appreciated in the art, the frequency of the range clock is varied in accordance with the range scale to which the radar system is set. The range scale frequency is controlled via a signal on leads 17 in a manner to be described.

The digital video from the threshold circuit 13 is applied to an interference rejection filter 18 which removes interference signals by performing a two out of three correlation of returns in corresponding range cells in three consecutive range sweeps. If the returns for two of the three range bins are above the noise level determined by the threshold set by the operator in the threshold circuit 13, the present return is considered valid and is transmitted for storage. Otherwise the return is considered noise and rejected. Interference rejection filters suitable for use in the present invention are well known in the art. The structure and operation of the interference rejection filter 18 utilized herein will be later described. The range clock signal from the radar system clock 15 is applied to the interference rejection filter 18 to clock the digital radar video bits therethrough in accordance with the range bins into which the radar range sweeps are quantized.

The filtered digital radar video from the interference rejection filter 18 is applied to a serial-to-parallel converter 19. The range clock signal from the radar system clock 15 is applied to the serial-to-parallel converter 19 to clock the digital video bits therein in accordance with the corresponding range bins of the radar sweep. After a full range sweep of radar data is clocked into the converter 19, it is strobed out in parallel by the end of range signal from the range counter 16. It is appreciated that in the system exemplified herein where the range sweeps are quantized into 256 range bins, the parallel word strobed from the converter 19 comprises 256 bits corresponding to the respective range bins of the quantized range sweeps.

The parallel radar data words for the converter 19 are stored into a radar storage memory 20 at addresses corresponding to the radar antenna azimuthal position. The memory 20 is addressed for the storage of the radar data by a synchro-to-digital converter 21 coupled to the radar antenna to provide the azimuth address signal. The memory 20 contains storage for the number of words corresponding to the number of azimuth sectors into which the display is quantized, each word comprising the number of bits corresponding to the number of range bins into which the range sweeps are quantized. In the embodiment of the invention exemplified herein the memory 20 provides storage for 1,024 words at the corresponding azimuth addresses, each comprising 256 bits. Thus the radar returns are stored in the radar storage memory 20 in accordance with the radar range and azimuth and the data is stored at a rate depending upon the range scale selection and radar trigger frequency.

In the operation of the circuitry of FIG. 3, a radar trigger from the buffer 14 starts the radar system clock which provides the range clock signal at a frequency determined by the range scale parameter on the leads 17. The range clock signal clocks the digital video radar returns into the serial-to-parallel converter until the range counter 16 provides the end of range signal signifying the end of the range sweep. The end of range signal disables the radar system clock 15 in preparation of the next cycle and strobes the parallel radar data into the radar storage memory 20 at the azimuth address corresponding to the radar antenna azimuthal position provided by the synchro-to-digital converter 21. In this manner a complete azimuthal scan of digitized radar data is stored in the memory 20. It will be appreciated that as the radar antenna scans through one of the 1,024 azimuth sectors, more than one radar trigger may occur. The radar data corresponding to the last occurring radar trigger in an azimuth sector is stored at the address in the memory 20 corresponding to that azimuth sector. The radar data words stored at the azimuth addresses in the memory 20 may be read out in parallel onto conductors 23 in accordance with an azimuth address signal on a lead 22 for reasons to be described.

Figure 4:
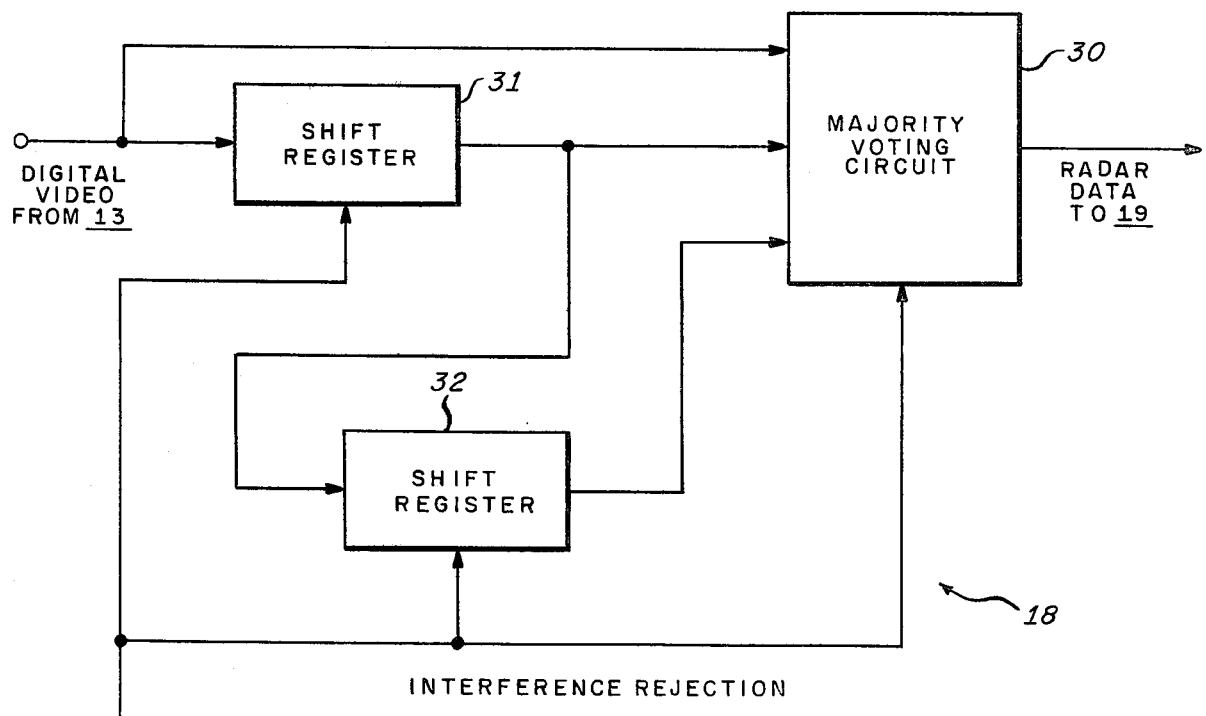
FIG. 4 is a schematic block diagram illustrating details of the interference rejection filter of FIG. 3.

Referring now to FIG. 4, details of the interference rejection filter 18 of FIG. 3 are illustrated. The digital video from the threshold circuit 13 is applied as an input to a three input majority voting circuit 30. The majority voting circuit 30 provides a binary ONE at its output whenever a majority of the inputs thereto receive binary ONE's. When this condition is not fulfilled, the output of the majority voting circuit is binary ZERO. Thus with the three input circuit 30, when two or three of the inputs are receiving binary ONE's, the output thereof is binary ONE, otherwise the output thereof is binary ZERO. The majority voting circuit 30 is clocked by the range clock from the radar system clock 15 of FIG. 3. The majority voting circuits of the type described are well known in the art.

The digital video signal from the threshold circuit 13 is also applied as an input to a shift register 31 whose output is applied as a second input to the majority voting circuit 30. The shift register 31 contains a number of stages equal to the number of bits of the words stored in the radar storage memory 20 (FIG. 3). Thus the shift register 31 provides storage for one range sweep of radar data. In the embodiment of the invention exemplified herein the shift register 31 is 256 stages long. The shift register 31 is clocked by the range clock signal from the radar system clock 15. The shift register 31 may conveniently be implemented by the high speed static shift register disclosed in U.S. patent application Ser. No. 40,337, filed May 18, 1979 in the name of Johnny A. Cornett, entitled "High Speed and Long Length Static Shift Register" and assigned to the assignee of the present invention.

The output of the shift register 31 is applied as an input to a second shift register 32 identical to the register 31. The output of the shift register 32 is applied as the third input to the majority voting circuit 30 and is clocked by the range clock signal.

In operation, the shift registers 31 and 32 store the radar data corresponding to two previous range sweeps and the majority voting circuit 30 compares the digitized radar data in the corresponding range bins of the presently occurring range sweep and the two previously occurring range sweeps. This two out of three correlation is performed as the data is serially shifted through the circuitry in order to provide interference rejection filtering in a manner well appreciated in the art. The filtered radar data is provided by the output of the majority voting circuit 30. Thus the interference rejection filter 18 compares the digitized radar video in corresponding range cells with respect to three consecutive range sweeps as the data is serially shifted by the range clock.

As described above with respect to FIG. 3, a complete frame of radar data is stored in the radar storage memory 20 in radar real time. In accordance with the invention, the data is displayed in non-real time utilizing the $\Delta X$, $\Delta Y$, X-rate and Y-rate parameters described above with respect to FIG. 2 to generate a rapidly rotating (R,$\theta$) PPI display scan for rapid and continuous writing of the radar frames.

Figure 5:
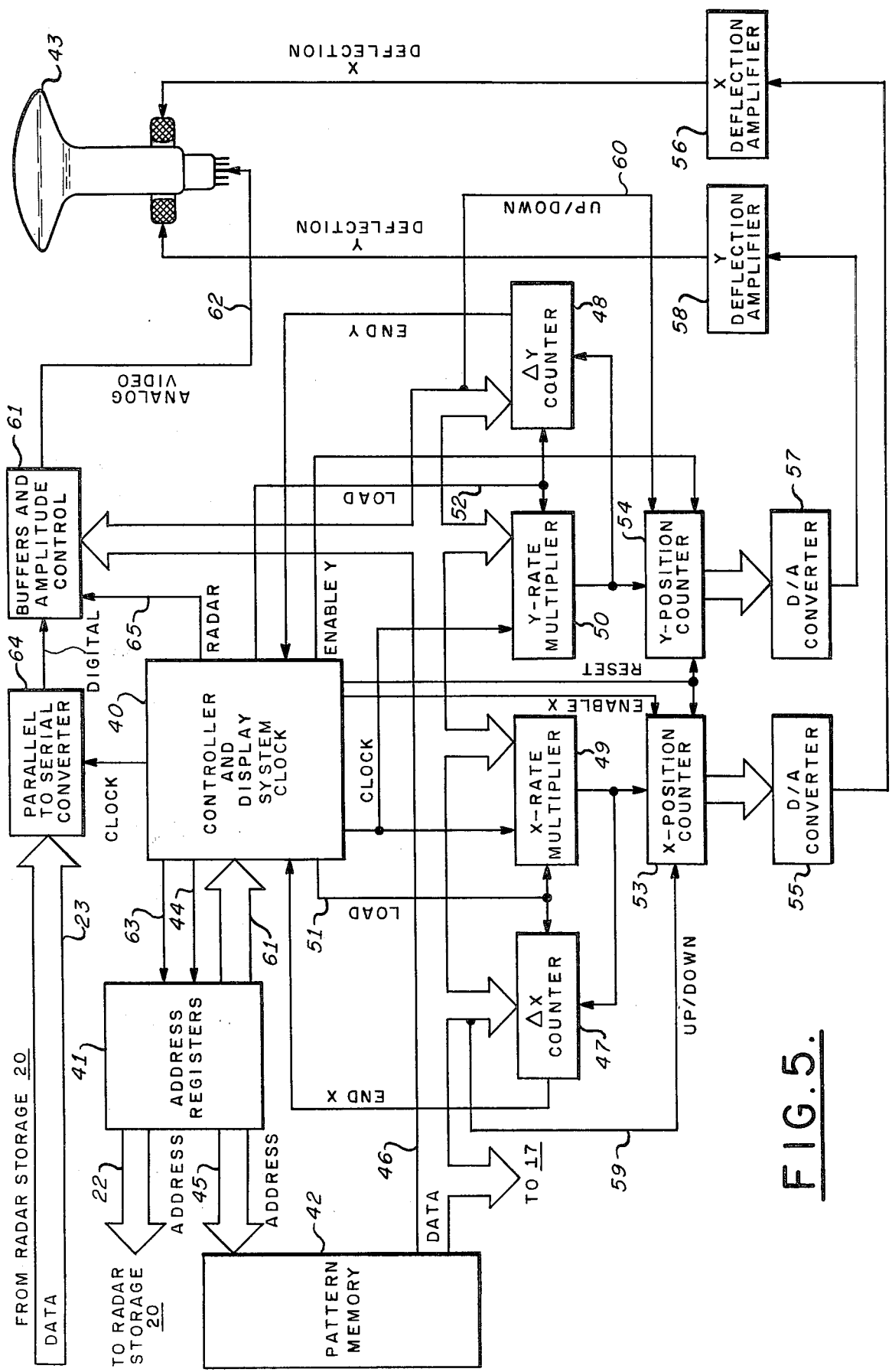
FIG. 5 is a schematic block diagram illustrating the display portion of the apparatus in accordance with the invention.

Referring now to FIG. 5, apparatus for providing the rapidly and continuously refreshed frames of radar data as well as for writing frames of synthetic symbology is illustrated. It is appreciated that in accordance with the preferred embodiment, the interleaved frames of radar data and synthetic symbology are generated at a rate of, for example, 16 display cycles per second. The apparatus of FIG. 5 includes a controller and display system clock circuit 40 which via address registers 41 and a pattern memory 42 controls the apparatus to provide the collision avoidance display exemplified in FIG. 1 on the screen of a cathode ray tube 43. The controller circuits 40 increment via a control lead 44 the address register in the block 41 to provide via address leads 45 sequential addresses to the pattern memory 42. The pattern memory 42 contains control words that are sequentially addressed to generate the frames of radar and synthetic symbology data.

Figure 6:
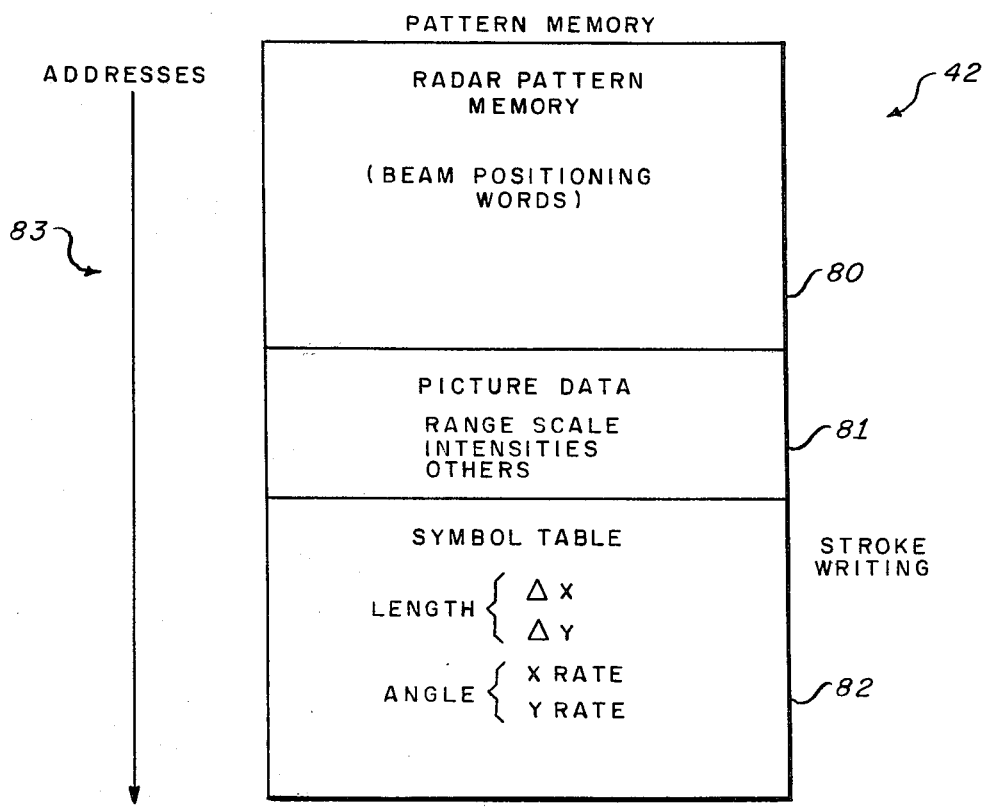
FIG. 6 is a memory map of the pattern memory of FIG. 5.

Referring for the moment to FIG. 6, a map of the pattern memory 42 is illustrated. The pattern memory 42 includes a section 80 containing a sequence of words for generating the rotating (R,$\theta$) PPI scan for the display tube 43. In the embodiment of the invention exemplified herein, the section 80 of the memory 42 contains 1,024 address locations for storing the 1,024 words utilized in generating the 1,024 azimuth sweeps into which the rapidly rotating PPI display scan is quantized. Each such word contains the $\Delta X$, $\Delta Y$, X-rate and Y-rate parameters discussed above with respect to FIG. 2 for controlling the associated sweep line at the appropriate angle $\theta$. In the instance of the radar sweep data stored in the section 80 of the memory 42, $\Delta X$ and $\Delta Y$ are selected to provide a sweep length from display center to the edge of the screen. The values of X-rate and Y-rate are selected, in the manner described above with respect to FIG. 2, to control the angle $\theta$ and to provide uniform display brightness over the entire display screen. A sequential addressing of the words stored in the section 80 of the memory 42 generates the 1,024 azimuth sweeps comprising one complete rotating PPI scan in a manner to be described.

Alternatively, each of the 1,024 words stored in the section 80 of the memory 42 may contain only the X-rate and Y-rate data to control the angle $\theta$ at which the sweep is generated as well as the sweep rate thereof. In this alternative arrangement the length of the sweep is controlled by a comparison with an edge of screen value to appropriately terminate the sweep.

With continued reference to FIG. 6, the pattern memory 42 includes a section 81 containing words for controlling picture data such as range scale, video intensity, range ring intensity, sweep intensity, symbol intensity and the like. The picture data words in the section 81 of the memory 42 are stored at consecutive addresses which follow sequentially from the addresses of the section 80 of the memory 42. These words are utilized, in a manner to be described, to control the frequency of the radar system clock 15 of FIG. 3 in accordance with range scale as discussed above with respect to FIG. 3 as well as to control the intensity of the display of radar and synthetic symbology and the like.

The memory 42 also contains a symbol table section 82 for storing the words utilized to generate synthetic symbology. The words in the section 82 of the memory 42 are at consecutive addresses following sequentially from the addresses of the picture data section 81. Each word of the section 82 of the memory 42 contains the $\Delta X$, $\Delta Y$, X-rate and Y-rate data for generating a stroke of a desired synthetic symbology to be displayed. By sequentially addressing the words stored in the symbol table 82, all of the synthetic symbology is generated in a manner to be explained.

It is appreciated with reference to FIG. 6, that by sequentially addressing all of the words in the pattern memory 42, as indicated by the arrow 83, a complete rotating display scan is generated for the display of the radar data followed by accessing the miscellaneous control words of the section 81, which words are routed to and latched into appropriate storage latches and thereafter the section 82 of the memory 42 controls the generation of all of the straight line strokes comprising the desired synthetic symbology. In the preferred embodiment of the invention exemplified herein the words of the memory 42 are sequentially accessed 16 times per second to provide interleaved display frames of radar data and synthetic symbology.

Referring again to FIG. 5, the controller 40 increments the address register in the block 41 that provides the pattern memory address on the leads 45 thereby sequentially addressing the words of the pattern memory as described above with respect to FIG. 6. For each word accessed from the section 80 of the memory 42 for generating the lines of the rotating scan and for each word accessed from the symbol table section 82 of the memory 42 for generating the strokes of the synthetic symbology, the accessed word is applied to a data bus 46 and the $\Delta X$, $\Delta Y$, X-rate and Y-rate quantities are distributed respectively to a $\Delta X$ counter 47, a $\Delta Y$ counter 48, an X-rate multiplier 49 and a Y-rate multiplier 50. The counters 47 and 48 are conventional binary counters and the multipliers 49 and 50 are conventional binary rate multipliers. The respective quantities are loaded into the respective registers via load signals provided on leads 51 and 52 by the controller 40.

The block 40 also includes a display system clock for providing a clock signal at a frequency in accordance with the writing rate desired in the system. The clock signal from the controller and display system clock 40 is applied as an input to the multipliers 49 and 50.

The output from the X-rate multiplier 49 is applied as an input to the ΔX counter 47 and as an input to an X-position counter 53. Similarly, the output from the Y-rate multiplier 50 is applied as an input to the ΔY counter 48 as well as an input to a Y-position counter 54. The overflow signal from the ΔX counter 47, designated as END X, is applied as a control signal to the controller 40 and the overflow output from the ΔY counter 48, designated as END Y, is applied as a control signal to the controller 40. The controller 40 provides an enable X signal to the X-position counter 53 and an enable Y signal to the Y-position counter 54 as well as a reset signal to both of the counters 53 and 54.

The binary digital output from the X-position counter 53 is applied to a digital-to-analog converter 55 which provides the X deflection signal to the deflection yoke of the cathode ray tube 43 via an X-deflection amplifier 56. Similarly, the binary digital output from the counter 54 is applied to a digital-to-analog converter 57 which provides the Y-deflection signal to the deflection yoke of the cathode ray tube 43 via a Y-deflection amplifier 58.

Thus with a word from either section 80 or section 82 of the pattern memory 42 being addressed by the address signal on the leads 45, the corresponding ΔX, ΔY, X-rate and Y-rate parameters are loaded into the registers 47-50 by the load signal on the leads 51 and 52. The controller 40 then applies the display system clock to the multipliers 49 and 50 and enables the position counters 53 and 54 via the enable X and enable Y signals. The ΔX and ΔY counters 47 and 48 are designed to count downwardly toward zero from the ΔX and ΔY values preset therein and the position counters 53 and 54 are designed to count controllably upwardly or downwardly in accordance with the angle $\theta$ at which the line is to be generated. For angles between 0° and 90° the counters 53 and 54 are set to count upwardly. For angles between 90° and 180° the Y-position counter 54 is set to count upwardly while the X-position counter 53 is set to count downwardly. For angles between 180° and 270° both the X-position counter 53 and the Y-position counter 54 are set to count downwardly and for angles between 270° and 360° the X-position counter 53 is set to count upwardly while the Y-position counter is set to count downwardly.

As discussed above with respect to FIG. 2, each ΔX and ΔY parameter stored in the memory 42 has a sign bit associated therewith which is utilized to control the counting direction of the associated position counter 53 or 54. The ΔX sign bit is provided from the memory 42 on a lead 59 to control the counting direction of the X-position counter 53 and ΔY sign bit is provided on a lead 60 to control the counting direction of the Y-position counter 54. It will be appreciated that the polarity of the sign bits correspond to the polarities of the equivalent sines and cosines as indicated on FIG. 2.

The controller 40 applies the display system clock to the X-rate multiplier 49 and to the Y-rate multiplier 50. The X-rate multiplier 49 in turn provides a corresponding clock signal to the ΔX counter 47 and the X-position counter 53 at a frequency proportional to the X-rate parameter stored therein. The Y-rate multiplier 50 provides a corresponding clock signal to the ΔY counter 48 and the Y-position counter 54 at a frequency proportional to the Y-rate parameter stored therein.

Thus, as the ΔX counter 47 is counting toward zero from the ΔX value, the X-position counter 53 is counting in a direction governed by the ΔX sign signal on the lead 59 from the value that was resident therein at the beginning of the line generating cycle. The X-position counter 53 is counting at a rate controlled by the frequency of the clock provided from the multiplier 49. The output from the X-position counter 53 is converted to an analog deflection signal in the converter 55 and applied via the X-deflection amplifier 56 to provide the X deflection signal to the deflection yoke of the cathode ray tube 43. In a similar manner, the Y-position counter is counting in a direction governed by the ΔY sign signal on the lead 60 at a rate proportional to the frequency of the clock signal provided by the multiplier 50. The converter 57, in turn, provides the corresponding Y deflection signal via the Y-deflection amplifier 58 to the deflection yoke of the cathode ray tube 43 while the ΔY counter 48 is counting downward to zero from the 66 Y parameter set therein.

Thus as this counting procedure is occurring the beam is being deflected from the X-position and Y-position that were resident in the counters 53 and 54 respectively at the start of the line generation cycle at an angle $\theta$ in accordance with the X-rate and Y-rate parameters set into the multipliers 49 and 50, in a direction governed by the ΔX and ΔY sign signals on the leads 59 and 60 at a rate controlled by the values of the X-rate and Y-rate parameters.

When the ΔX counter 47 counts down to zero, the END X signal is issued to the controller 40 which, in turn, disables the X-position counter 53 via the enable X lead. Similarly, when the ΔY counter 43 counts down to ZERO, the END Y signal issued thereby to the controller 40 results in disablement of the Y-position counter 54. In this manner the ΔX and ΔY parameters loaded into the respective counters 47 and 48 control the length of the line being generated.

When the address signal on the leads 45 from the address registers 41 is accessing addresses in the radar pattern section 80 of the pattern memory 42 for generating the sweeps in the rotating PPI scan on the display tube 43, the controller 40 issues a reset signal (as indicated by the legend) to reset the position counters 53 and 54 to zero after each sweep is generated. The reset signal is issued by the controller 40 in response to the END X and END Y signals from the ΔX and ΔY counters 47 and 48. In this manner when a frame of radar data is being generated, the azimuth sweeps originate from own ship's cross (FIG. 1) and comprise radial sweeps to the edge of the screen and the radar PPI scan rotates about radar range zero.

When the address signals on the leads 45 from the address registers 41 are accessing words in the symbol table 82 (FIG. 6) of the pattern memory 42 and the system is displaying a frame of synthetic symbology, the controller 40 does not reset the position counters 53 and 54 after each stroke, thus providing concatenated straight lines to draw symbology of any shape and size.

The controller 40 controllably provides the reset signal to the counters 53 and 54 in accordance with the addresses being accessed in the pattern memory 42. The address registers 41 provide signals via conductors 61 to the controller 40 designating which of the sections 80, 81 or 82 (FIG. 6) of the pattern memory 42 is being accessed. Circuits for providing these signals are well known to routineers in the art and will not be further described herein for brevity.

As described, the azimuth sweeps of the rotating (R,θ) PPI scan may be generated by the sequential accessing of words stored in the radar pattern section 80 of the pattern memory 42, each word containing the ΔX and ΔY parameters for controlling the length of the sweep and the X-rate and Y-rate parameters for controlling the angle θ of the sweeps. It is appreciated that alternatively the rotating scan may be generated from words containing only the X-rate and Y-rate parameters for controlling the sweep line angles and utilizing circuits (not shown) for comparing the length to an edge of screen value for controlling the lengths.

As described, the controller 40 sequentially addresses the words in the pattern memory 42 to generate interleaved frames of rotating radar scans and synthetic symbology generation. During each sequential addressing of the memory 42 the words in the picture data section 81 of the memory 42 are addressed and routed to appropriate locations in the system for providing various control functions. As described, the address registers 41 provide signals via leads 61 to the controller 40 indicating which section of the pattern memory 42 is being accessed. When the picture data section 81 is addressed, the controller 40 provides numerous control signals to effectuate the routing and latching of the words stored in the picture data memory section 81. The picture data section 81 contains, inter alia, two words, one for controlling the range scale function and the other for controlling overall display intensity. The picture data words addressed are applied to the data bus 46 and routed to the appropriate locations. For example, the range scale word is routed via the data bus 46 to provide a signal via leads 17 to the radar system clock 15 (FIG. 3) for controlling the frequency thereof.

As described above with respect to FIG. 3, it is necessary to control the frequency of the radar system clock 15 in accordance with the range scale selected by the operator. By circuitry not shown, the value of the range scale word stored in the picture data section 81 of the pattern memory 42 is adjusted in accordance with the setting of the range scale knob on the control console of the system. This word routed to the radar system clock 15 (FIG. 3) via the leads 17 effectuates the necessary radar system clock frequency control by conventional circuitry.

Referring still to FIG. 5, the display generation apparatus of the invention includes a buffers and amplitude control block 61 that provides the Z-axis modulation or analog video signal via a lead 62 to the intensity control electrode of the cathode ray tube 43 for intensifying the beam. The circuitry within the block 61 provides the appropriate radar video when the rotating PPI scan is being generated as well as the appropriate intensity signal when the straight line strokes of the synthetic symbology are being generated and controls the overall display intensity in a manner to now be described.

When the display intensity word in the picture data section 81 of the pattern memory 42 is addressed, the word is routed via the data bus 46 to the block 61. The value of the word is utilized in a conventional manner to control the amplitude of the analog video signal applied to the lead 62. For Example, the amplitude control function of the block 61 may be effected by converting the display intensity word to an analog signal via a digital-to-analog converter and applying the output of this converter to the control lead of a gain controlling amplifier which provides the analog video signal. Such gain controlling circuits are well known in the art and will not be further described herein for brevity. The overall display intensity is controlled by an operator adjustment on the radar system control panel which adjusts the value of the display intensity word stored in the picture data section 81 of the pattern memory 42 so that when the word is routed to the amplitude control block 61 the desired video amplitude control is effected.

The manner in which the analog video signal on the lead 62 is generated so as to intensify the beam during the generation of the rotating PPI scan to display the radar data and during the synthetic symbol generation frames to display the synthetic symbology will now be described. The address registers block 41 includes an address register that provides azimuth address signals via address leads 22 to the radar storage memory 20 of FIG. 3. This azimuth address register is incremented by the controller 40 via a lead 63. As discussed above with respect to FIG. 3, the radar storage memory 20 comprises words corresponding respectively to the azimuth sectors into which the display is quantized. Each azimuth storage word contains bits corresponding respectively to the range bins into which the azimuth sectors are quantized. As described above, the radar storage memory 20 is at any time storing a full frame of radar data gathered during the current scan of the antenna and stored in the memory 20 in radar real time. In order to provide the radar video for the display, the azimuth words of the radar storage memory 20 are sequentially addressed to provide the data stored therein. Thus the controller 40 via the lead 63 increments the address register in the block 41 that provides the address signals on the address leads 22 to the radar storage memory 20 for sequentially accessing the azimuth words stored therein. The controller 40 provides the incrementing signals on the leads 63 in synchronism with the incrementing signals on the lead 44 whereby the azimuth storage words of the radar storage memory 20 are accessed in synchronism with the rotating scan sweep generation words of the radar pattern section 80 of the pattern memory 42. Thus when the address on the leads 45 is accessing a word in the radar pattern section 80 of the pattern memory 42 to generate an azimuth sweep on the cathode ray tube 43 at a particular angle θ, the address on the address leads 22 addresses the radar storage memory 20 to access the corresponding azimuth word therein.

The accessed words from the radar storage memory 20 are applied in parallel via the data bus 23 to a parallel-to-serial converter 64 wherein the bits of the words are converted into serial format. The display system clock from the block 40 clocks the serial radar data bits into the block 61 for controlling the beam intensity. The digital radar bits are either binary ONE or binary ZERO and provide beam intensification when a ONE is present and beam blanking when a ZERO is present. These bits are buffered by conventional circuits and applied to the intensity control discussed above thereby providing the analog video signal on the lead 62 to display the radar data. The converter 40 applies the clock signal to the converter 64 in synchronism with enabling the position counters 53 and 54, thereby synchronizing the application of the serial radar data with the generation of the azimuth sweeps of the display. The radar data stored in the range bins of the azimuth storage words of the radar storage memory 20 thereby occur at the proper range locations along the azimuth sweeps of the rotating scan providing properly timed intensification for displaying the radar data. The controller 40 terminates application of display system clock pulses to the converter 64 in accordance with the azimuth sweeps reaching the edge of the screen as indicated either by the END X and END Y signals from the counters 47 or 48 or by the alternative arrangement wherein the sweep length is terminated by a comparison with an edge of screen value.

When the system is generating synthetic symbology as described above, the amplitude of the analog video signal on the lead 62 is continuously set at the display intensity level designated by the display intensity word in the picture data section 81 of the pattern memory 42 for the entire time that the beam is generating the straight line strokes for the synthetic symbology. The synthetic symbology generation mode of the display occurs when the addresses on the address leads 45 are accessing the words of the symbol table 82 of the pattern memory 42. When the addresses on the address leads 45 are accessing the picture data control words in the section 81 of the pattern memory 42, the cathode ray tube beam is blanked.

As previously described, the address registers 41 provide signals to the controller 40 via the leads 61 indicating which section of the pattern memory 42 is being accessed. Accordingly the controller 40 provides a logic signal on leads 65 indicative of whether the system is in the radar mode, i.e., accessing the radar pattern section 80 of the pattern memory 42 or is in the synthetic symbology generation mode, i.e., accessing the symbol table 82 of the pattern memory 42 or is in the non-display mode wherein the picture data control words are being accessed from the section 81 of the pattern memory 42. Accordingly, the logic signal on the leads 65 controls the circuitry in the block 61 in the radar mode to modulate the beam intensity utilizing the radar data from the radar storage memory 20. The logic signal on the leads 65 controls the circuitry within the block 61 to apply the operator selected intensity continuously while the synthetic symbology is being generated. Similarly, the logic signal on the leads 65 controls the circuitry within the block 61 to blank the beam while the picture data from the section 81 of the pattern memory 42 is being routed and latched. The circuitry within the block 61 for performing the described functions is conventional and will not be further described herein for brevity.

It will be appreciated from the foregoing that as the radar antenna is scanning in azimuth, the last complete frame of radar data is being stored in the radar storage memory 20 of FIG. 3 in real radar time. Thus the frames of radar data in the memory 20 are being updated at the scanning rate of the antenna which in present day radar systems is approximately once every one to three seconds. The operation of the apparatus of FIG. 3 is timed by the radar system clock 15.

The apparatus of FIG. 5 for generating the display operates independently of the timing of the apparatus of FIG. 3 to provide the above described display in non-real time. The display of the radar data and the synthetic symbology is refreshed approximately 16 times per second to provide a steady bright display picture. When writing a frame of radar data, the apparatus of FIG. 5 accesses the radar storage memory 20 to obtain the full frame of radar data to be written on the display screen. The timing for the display apparatus of FIG. 5 is provided by the display system clock 40. It is appreciated that the radar system clock 15 of FIG. 3 and the display system clock 40 of FIG. 5 operate independently with respect to each other.

Figure 7:
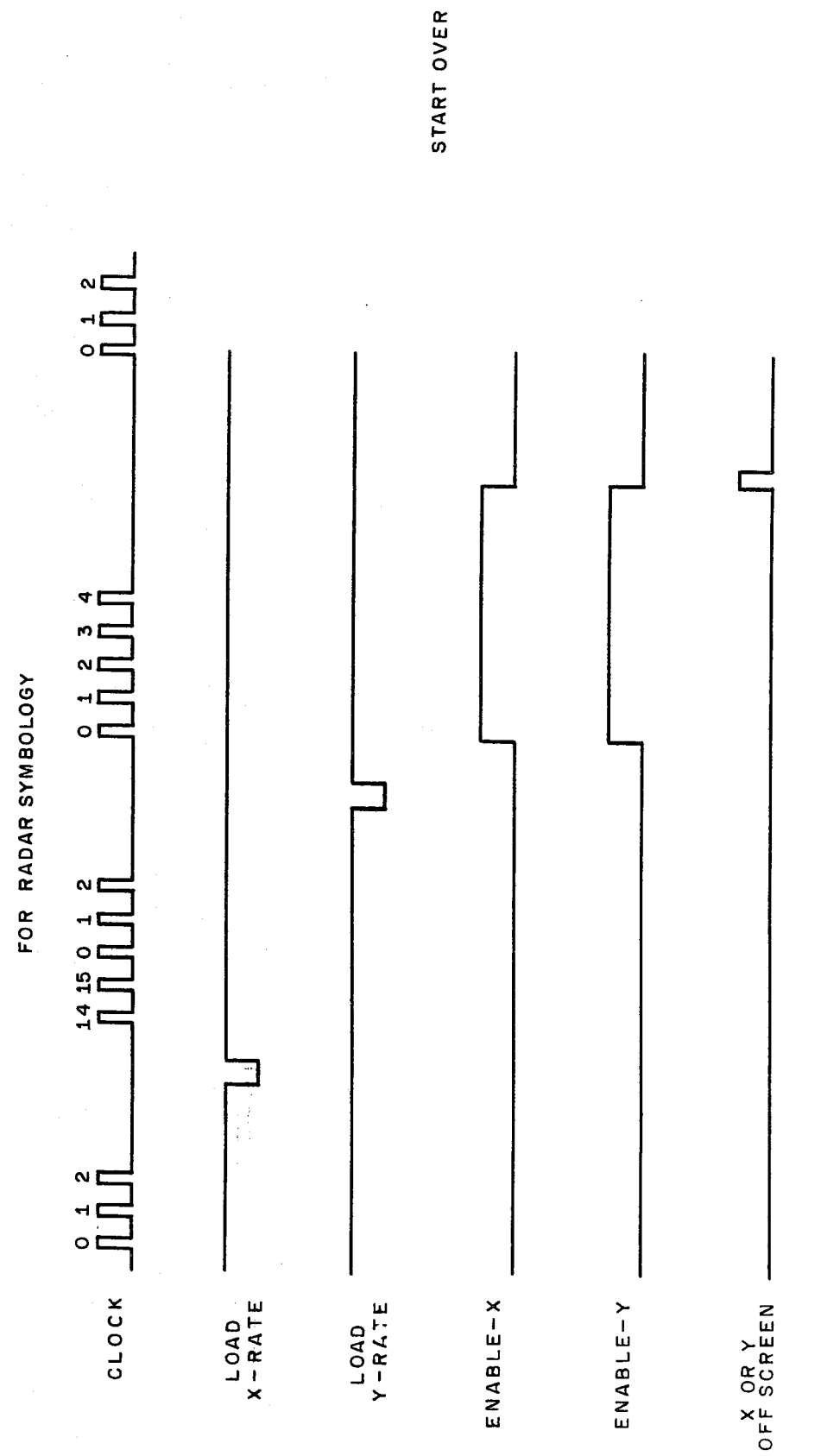
FIG. 7 is a waveform timing diagram useful in explaining the operation of the apparatus of FIGS. 3 and 5 with respect to displaying radar symbology.
Figure 8:
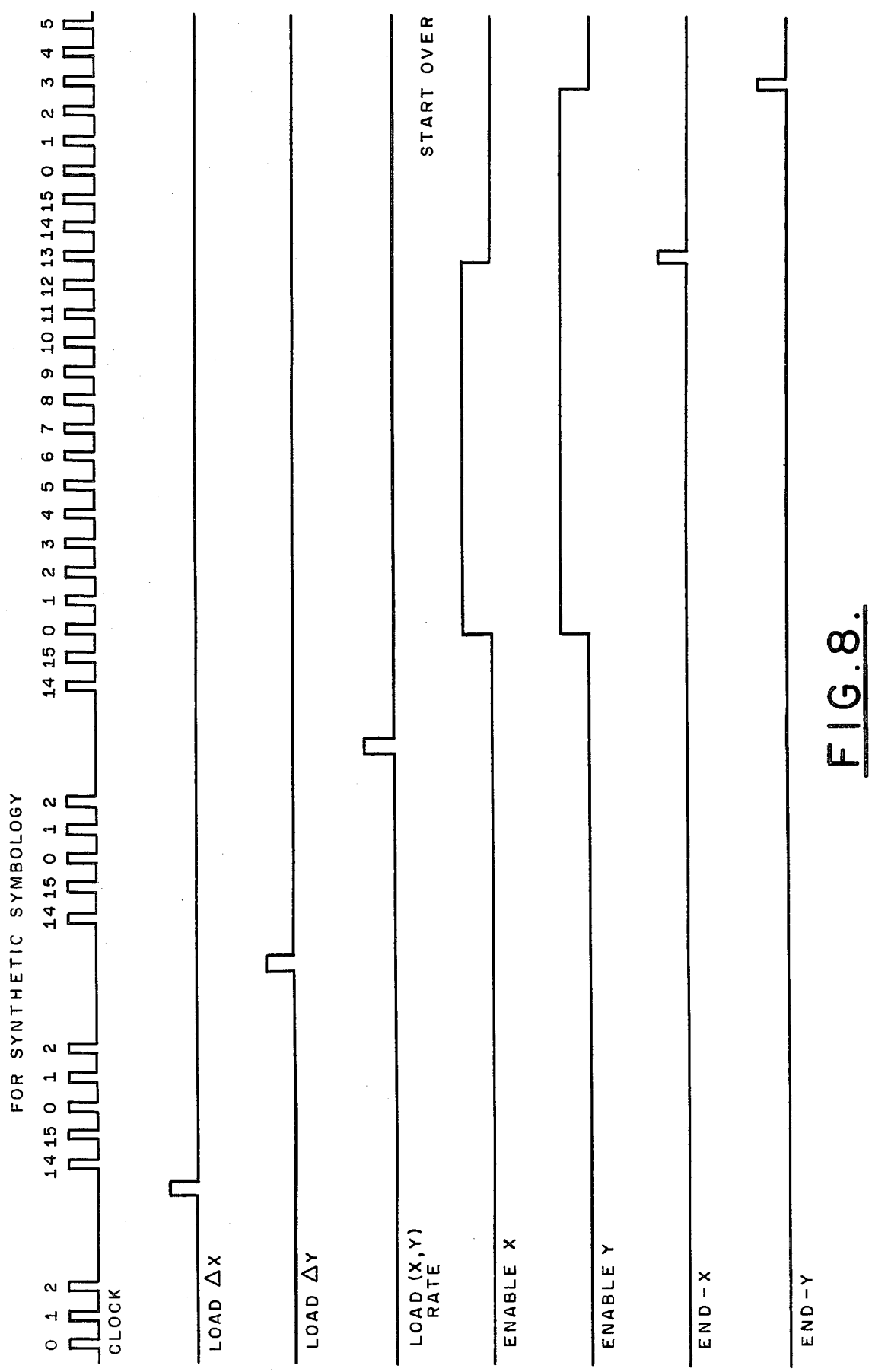
FIG. 8 is a waveform timing diagram useful in explaining the operation of the apparatus of FIGS. 3 and 5 with respect to displaying synthetic symbology.

Referring now to FIGS. 7 and 8, timing diagrams of typical waveforms of the signals utilized in the apparatus of FIGS. 3 and 5 are illustrated. The diagram of FIG. 7 depicts the timing of the apparatus during the generation of a radar frame and the diagram of FIG. 8 illustrates the timing of the apparatus when generating a frame of synthetic symbology.

As described above, because the beam displacement rate is uniform for all display line angles and lengths as well as for all of the azimuth sweeps of the rotating PPI display scan, a uniformly bright display is provided for all of the symbology. The display brightness does not vary in accordance with the range scale selected by the operator. Since identically the same deflection apparatus is utilized for the generation of the rotating PPI radar scan as well as for the generation of the straight line strokes for the synthetic symbology, significant economies of apparatus have been achieved by the present invention as well as perfect registration between the radar and synthetic symbology, a result not as readily achieved with the prior art systems that utilized separate deflection systems and circuits as discussed above.

The present invention provides a bright daylight viewable display that is independent of the radar trigger and radar antenna rotation rates providing a significant improvement over systems available in the prior art. The constant beam sweep rate for all modes and symbols significantly reduces the system average power dissipation. In the prior art systems utilizing varying sweep rates for the different range scales, the beam deflection amplifiers were necessarily designed to accommodate the fastest sweep rates utilized. This, in turn, required power supplies commensurate with the most stringent display conditions. Thus, in the prior art systems, during most of the system operating time, excess power was dissipated. In the present invention the deflection amplifiers and power supplies are designed to accommodate the uniform display sweep rate, therefore providing lower average power dissipation compared to the prior art systems.

In the prior art systems, radar information was presented on a cathode ray tube by utilizing the radar trigger to initiate the display sweep and utilizing the antenna position to define the sweep angular position by modulating the relative amplitudes of the horizontal and vertical sweep signals. This arrangement provided a display that was dependent upon radar trigger frequency and antenna rotation rate resulting in the disadvantages discussed above. The present invention provides a display that is independent of radar trigger and antenna rotation rates.

The above exemplified embodiment of the invention was described in terms of a centered display. It will be appreciated that for convenience, range center (own ship's cross of FIG. 1) may be offset to a position near the bottom of the screen. The above described embodiment is readily adaptable to accommodate a display that is selectively either offset or centered. To provide for an offset display, the words of the radar storage memory 20 are selected of a length to accommodate the increased length of the azimuth sweeps. In the embodiment exemplified above, 256 bits corresponding to the 256 range bins into which the azimuth sweeps are quantized for a centered display, are utilized as the memory word length. For an off-centered display, 384 bits, for example, may be utilized to accommodate off-centered azimuth sweeps quantized into 384 range bins. The rotating PPI scan would, in the off-centered mode, rotate about a point near the bottom of the display screen. This is achieved by resetting the X-position counter 53 and Y-position counter 54 (FIG. 5) to the off-set coordinates after each azimuth sweep of the rotating scan instead of to the range origin as previously described. It would also be necessary to adjust the range counter 16 of FIG. 3 to selectively overflow after either 256 counts or after 384 counts, depending on whether a centered or off-centered display was being generated. Additionally, means (not shown) would be included to off-set the synthetic symbology data stored in the symbol table 82 of the pattern memory 42 to provide the off-set display of the synthetic symbology. Such an off-set display capability may be utilized in a collision avoidance system providing either a north-up or own-ship's-course-up display. Conveniently, the centered display may be utilized in the north-up mode and the off-centered display utilized in the course-up mode.

When the operator sets the system to provide the off-set display, the complete word length of the words in the radar storage memory 20 as well as the off-setting circuitry described, is utilized. In the exemplified embodiment of the invention having the two display modes, the full word length for the radar storage memory 20 is 384 bits. When the operator selects the centered display, conventional circuitry (not shown) utilizes only the first 256 bits of the stored words to provide the centered presentation as described above.

Although the above exemplified embodiment of the invention was described in terms of a cathode ray tube 43 for presenting the display, other display devices may be utilized to the same effect.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. In a radar system including an antenna scannable in azimuth for receiving radar return data, apparatus for displaying said radar return data, comprising
    radar data memory means for storing radar return data corresponding to a complete scan of said antenna,
    display means including a display face,
    rotating scan generation means coupled to said display means for generating a PPI display scan with respect to said display face rotating at a rate independent of the azimuth scanning rate of said antenna,
    addressing means for addressing said radar data memory means in synchronism with the generation of said PPI display scan for providing said radar return data stored therein, and
    means for applying said stored radar return data addressed by said addressing means to said display means for displaying said addressed radar return data in synchronism with said rotating scan.

2. The apparatus of claim 1 in which said rotating scan generation means comprises means for generating said PPI display scan rotating at a rate greater than the azimuth scanning rate of said antenna.

3. The apparatus of claim 1 in which
    said PPI display scan comprises sequentially generated display azimuth sweeps each generated at a display azimuth angle, and
    said rotating scan generation means comprises means for sequentially generating said display azimuth sweeps.

4. The apparatus of claim 3 in which
    said radar system provides said radar return data in range sweeps at azimuthal positions of said antenna as said antenna performs said complete scan,
    said radar system further includes antenna azimuthal position converter means for providing a digital azimuthal signal in accordance with the azimuthal position of said antenna, and
    said radar data memory means comprises means for storing said radar return data as digital words corresponding to said range sweeps at memory locations addressed by said digital azimuth signal.

5. The apparatus of claim 4 in which said addressing means comprises means for addressing said radar data memory means in accordance with an azimuthal address corresponding to said display azimuth angle of said display azimuth sweep generated by said azimuth sweep generating means.

6. The apparatus of claim 3 in which said display means comprises cathode ray tube means having X-deflection means and Y-deflection means for deflecting the cathode ray tube beam along the X and Y display axes respectively.

7. The apparatus of claim 6 in which said rotating scan generation means comprises
    means for providing an X-rate signal and a Y-rate signal corresponding to each said display azimuth sweep in accordance with said display azimuth angle and in accordance with a desired deflection rate of said display azimuth sweep, and
    X-beam positioning means and Y-beam positioning means responsive to said X- and Y-rate signals respectively for providing X- and Y-deflection signals to said X- and Y-deflection means respectively in accordance with said respective X- and Y-rate signals,
    thereby deflecting said cathode ray tube beam along said display azimuth sweeps to generate said rotating display scan.

8. The apparatus of claim 7 in which each said beam positioning means comprises
    display system clock generating means for providing a display clock signal,
    binary rate multiplier means responsive to said display clock signal and the associated one of said X- and Y-rate signals for providing a further display clock signal at a frequency proportional to said associated one of said rate signals,
    position counter means responsive to said further display clock signal for providing a digital position signal in accordance therewith, and
    digital-to-analog converter means responsive to said digital position signal for providing the associated one of said X- and Y-deflection signals.

9. The apparatus of claim 7 in which said rotating scan generation means further includes means for providing a $\Delta X$ signal and a $\Delta Y$ signal for each said display azimuth sweep in accordance with the length thereof,
    said beam positioning means further including length controlling means responsive to said $\Delta X$ and $\Delta Y$ signals for controlling the length of said display azimuth sweeps.

10. The apparatus of claim 8 in which said rotating scan generation means further includes means for providing a ΔX signal and a ΔY signal for each said display azimuth sweep in accordance with the length thereof, each said beam positioning means further including length control counter means responsive to said further display clock signal and a respective one of said ΔX and ΔY signals for providing a sweep termination signal in accordance with the associated one of said ΔX and ΔY signals.

11. The apparatus of claim 8 in which said rotating scan generation means further includes means for resetting said position counter means in each said beam positioning means to a predetermined value after generation of each said display azimuth sweep.

12. The apparatus of claim 7 in which
said means for providing an X-rate and a Y-rate signal comprises pattern memory means for storing a plurality of words corresponding to said respective display azimuth sweeps of said rotating display scan, each said word providing said X-rate signal and said Y-rate signal corresponding to the associated display azimuth sweep, and
said rotating scan generation means includes further addressing means for sequentially addressing said words of said pattern memory means to provide said X-rate and Y-rate signals for generating said display azimuth sweeps of said rotating display scan.

13. The apparatus of claim 12 in which
said radar system provides said radar return data in range sweeps at azimuthal positions of said antenna as said antenna performs said complete scan,
said radar system further includes antenna azimuthal position converter means for providing a digital azimuth signal in accordance with the azimuthal position of said antenna, and
said radar data memory means comprising means for storing said radar return data as digital words corresponding to said range sweeps at memory locations addressed by said digital azimuthal signal.

14. The apparatus of claim 13 in which said addressing means comprises means for sequentially addressing said digital words stored in said radar data memory means in accordance with an azimuthal address in synchronism with said further addressing means sequentially addressing said words of said pattern memory means to simultaneously address respective words in said radar data memory means and said pattern memory means corresponding to the same azimuthal position with respect to each other.

15. The apparatus of claim 9 further including symbol generation means for generating symbology composed of straight line strokes on said display face comprising,
symbol signal generation means for providing an X-rate signal and a Y-rate signal in accordance with the display azimuth angle of each said stroke and in accordance with a desired beam deflection rate for said stroke as well as a ΔX signal and a ΔY signal corresponding to each said stroke in accordance with the length thereof,
said X-rate and Y-rate signals being applied respectively to said X-beam positioning means and said Y-beam positioning means for deflecting said beam along said stroke, said ΔX and ΔY signals being applied to said length controlling means for controlling the length of said stroke.

16. The apparatus of claim 10 further including symbol generation means for generating symbology on said display face, said symbology being composed of straight line strokes, comprising
symbol signal generation means for providing an X-rate signal and a Y-rate signal in accordance with the display azimuth angle of each said stroke and in accordance with a desired beam deflection rate for said stroke as well as a ΔX signal and a ΔY signal corresponding to each said stroke in accordance with the length thereof,
said X-rate and Y-rate signals being applied respectively to said binary rate multiplier means in each said beam positioning means for deflecting said beam along said stroke, said ΔX and ΔY signals being applied respectively to said length control counter means in each said beam positioning means for controlling the length of said stroke.

17. The apparatus of claim 15 in which
said symbol generation means comprises pattern memory means for storing a plurality of words corresponding to said strokes respectively, each said word providing said X-rate signal, said Y-rate signal, said ΔX signal and said ΔY signal corresponding to the associated stroke to be generated, and
said apparatus includes further addressing means for sequentially addressing said words of said pattern memory means thereby providing said X-rate, Y-rate, ΔX and ΔY signals for generating said strokes on said display face.

18. The apparatus of claim 5 in which
said display means comprises cathode ray tube means having a beam intensification input, and
said means for applying said stored radar return data to said display means comprises parallel-to-serial converter means responsive to said digital words addressed in said radar data memory means for serially applying the bits thereof to said beam intensification input,
thereby displaying said radar return data in said range sweeps along said display azimuth sweeps of said rotating display scan.

19. The apparatus of claim 16 in which
said cathode ray tube means includes a beam intensification input, and
said apparatus includes means for applying a beam intensification signal to said beam intensification input when said strokes are being generated.

* * * * *